D. P. JONES.
SCAFFOLD TIE.
APPLICATION FILED APR. 19, 1913.
1,107,798.
Patented Aug. 18, 1914.
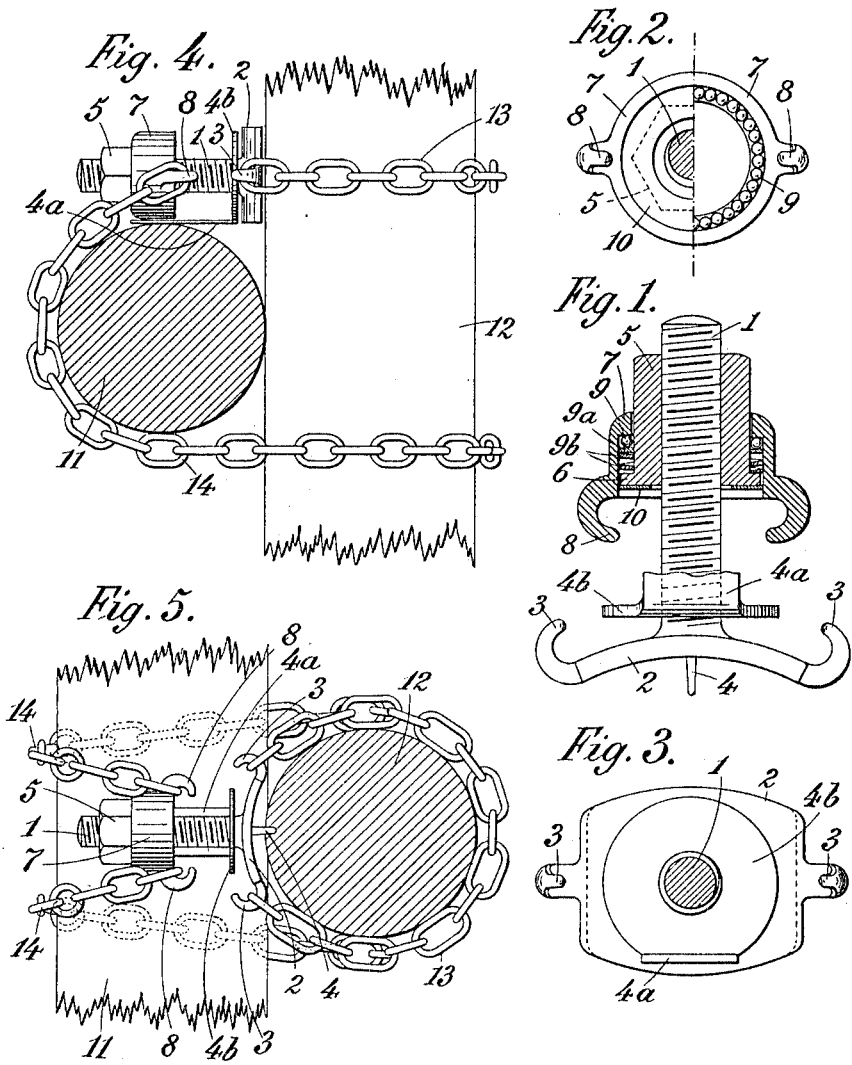

UNITED STATES PATENT OFFICE.

DANIEL PALMER JONES, OF LONDON, ENGLAND, ASSIGNOR TO THE PATENT RAPID SCAFFOLD TIE COMPANY LIMITED, OF LONDON, ENGLAND.

SCAFFOLD-TIE.

1,107,798.  Specification of Letters Patent.  Patented Aug. 18, 1914.

Application filed April 19, 1913. Serial No. 762,355.

*To all whom it may concern:*

Be it known that I, DANIEL PALMER JONES, residing in London, England, have invented certain new and useful Improvements in Scaffold-Ties, of which the following is a specification.

This invention relates to a device for binding or connecting together scaffold poles of the kind referred to in the specification of our British Letters Patent No. 24936 of 1907 and has for its object to modify the device at present in use with a view to extending its range of application.

The principal characteristic of the device described and shown in my above prior specification consists in the provision of two chains for one single contrivance so that the two chains are passed around the members, such as scaffold poles, and the two ends of both chains are connected to a single hook carrier or plate which is adapted to be moved along a screw bolt for the purpose of tightening the chains around the poles.

Now in contra-distinction to the previous construction the device according to the present invention although constructed on substantially similar lines as the device now actually in use, is provided with two distinct hook members or chain carriers so that each chain may be applied to a different carrier and the tractional forces on the chains in tightening may be caused on the contrivance to act in opposition to one another, as will be hereinafter more fully described with reference to the accompanying drawings, in which:

Figure 1 shows a sectional view of our improved scaffolding tie in somewhat reduced size. Fig. 2 is a top plan view in partial cross section and Fig. 3 a view of a section taken on a line above the part $4^a$. Fig. 4 is an elevation showing the tie in position for holding a vertical and horizontal scaffolding pole together. Fig. 5 is a top plan view of Fig. 4.

According to this invention and in the example shown the screw bolt 1 is provided with a base plate 2, which in contra-distinction to the construction hitherto used is shaped as a chain carrier proper by being provided with two hooks 3. This chain carrier may or may not be provided on its underside with a spike or pin 4, adapted to be driven into one of the poles to which the device is to be applied if desired, and with a guide portion, or plate $4^a$ which may be either integral with this carrier or separately screwed on the bolt, for instance, by means of a threaded ring portion $4^b$ and adapted to protect the pole against the scraping action of the adjacent metal parts. Arranged on the screw bolt 1 is a nut 5 having a flange 6 which is adapted to carry the second chain carrier or hooked plate 7. This plate 7 is provided with two hooks 8, preferably of opposite configuration to those arranged on the plate 2. Moreover, this plate 7 is, by preference, loosely rotatable on the nut 5, as hitherto, and in order to reduce friction between the plate and the nut, ball bearings 9 or other anti-friction device may be interposed between suitable surfaces arranged on the two members respectively, although the interposition of anti-friction means is not in practice absolutely necessary. Further, a spring washer $9^b$ or other elastic cushioning medium is preferably interposed between the two members 5 and 7 alone or with an intermediate washer $9^a$ in the case in which ball bearings are used at the same time, for the purpose of equalizing any inequalities in the strain which may be caused by expansion, contraction or other causes, due to climatic influences on either the metal parts or on the poles themselves.

For the purpose of preventing the plate 7 from sliding off the nut 5, a washer 10 is sprung into the cavity in the plate 7 beneath the flange 6, but of course any other suitable means may be employed for this purpose.

This construction has the advantage of enabling the contrivance to be used conveniently on top of each horizontal pole in scaffolding and to be fixed, if desired, on top or beneath a horizontal pole to the vertical pole, as clearly shown in Figs. 4 and 5, whereby on the one hand, it does not protrude from the horizontal pole where it is liable to be knocked against and disturbed in its position and on the other hand, that is to say, where it is arranged beneath the horizontal pole, it is protected by that pole from the influence of rain and the like. As shown in these figures, after the horizontal pole 11 is placed against the vertical pole 12, in the usual manner, such as by means of a temporary bracket, not shown, the tie 1 is placed either on top of the horizontal pole loosely or driven into the vertical pole, which latter operation, however, is only necessary in the event of the tie being fixed beneath the horizontal pole, after which one chain 13 is placed around the vertical pole and hooked on to the hooks 3 of the chain-carrier 2. The second chain 14, in the example illustrated, is then placed around the vertical pole and its ends are drawn over the horizontal pole, as shown, and hooked on to the hooks 8 of the second chain carrier 7. By means of a wrench or other suitable tool, the nut 5 is then turned so as to move toward the chain carrier 2, in which operation the chain carrier 7 is moved in the same direction, thus tightening the chain 14, whereby at the same time a pull is exerted in opposite direction on the chain 13 and both chains, therefore, are simultaneously tightened and the two poles securely bound together. The same action would be obtained if the tie were fixed beneath the horizontal pole, in which case the spike 4 which is used only as a temporary fixture may, of course, be ultimately withdrawn from the pole by the pull exerted on the chain acting on the chain-carrier 2, as will be readily understood by looking upon Figs. 4 and 5 in a reverse position.

It is of course obvious that either chain-carrier may be provided with more than two hooks and that the shape of these hooks and their position on the carrier may be varied at will and according to circumstances, without departing from the spirit of the invention.

What I claim and desire to secure by Letters Patent is:—

1. In a scaffold tie, a screw rod, a chain carrier integral therewith, an adjustable chain carrier on said rod, a chain for securing the integral chain carrier to one scaffold member, and a second chain for clamping a second scaffold member to the first, said chain carrier being adapted to maintain the second chain in its clamping position.

2. In a scaffold tie, a screw rod, means for securing said rod to a scaffold member, a chain carrier on said rod, a chain on said carrier for clamping a second scaffold member to the first, and a projecting device comprising a ring upon said rod, and a plate carried by said ring at right angles thereto and extending to protect the second scaffold member from said chain carrier.

In testimony whereof I have affixed my signature in presence of two witnesses.

DANIEL PALMER JONES.

Witnesses:
THOMAS KELSON,
C. R. COPE.

Copies of this patent may be obtained for five cents each, by addressing the "Commissioner of Patents, Washington, D. C."